(12) United States Patent
Ye et al.

(10) Patent No.: US 11,397,373 B2
(45) Date of Patent: Jul. 26, 2022

(54) CAMERA-LENS WATERPROOFING DEVICE

(71) Applicant: PEGATRON CORPORATION, Taipei (TW)

(72) Inventors: Long-Sing Ye, Taipei (TW); Chih-Yu Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 17/374,045

(22) Filed: Jul. 13, 2021

(65) Prior Publication Data
US 2021/0341819 A1 Nov. 4, 2021

Related U.S. Application Data

(63) Continuation of application No. 16/728,211, filed on Dec. 27, 2019, now Pat. No. 11,099,461.

(30) Foreign Application Priority Data

Mar. 20, 2019 (TW) .................................. 108109644

(51) Int. Cl.
*G03B 17/08* (2021.01)
*H04N 5/225* (2006.01)

(52) U.S. Cl.
CPC ........... *G03B 17/08* (2013.01); *H04N 5/2252* (2013.01)

(58) Field of Classification Search
CPC .............................. G03B 17/08; H04N 5/2252
See application file for complete search history.

(56) References Cited

U.S. PATENT DOCUMENTS

| | | | |
|---|---|---|---|
| 10,587,785 B2 | 3/2020 | Kawashima et al. | |
| 11,099,461 B2 * | 8/2021 | Ye | G03B 17/08 |
| 2009/0245767 A1 | 10/2009 | Sakai et al. | |
| 2013/0236166 A1 | 9/2013 | Enomoto et al. | |
| 2014/0060582 A1 | 3/2014 | Hartranft et al. | |
| 2016/0191864 A1 | 6/2016 | Siminoff et al. | |
| 2017/0272706 A1 | 9/2017 | Jeong | |
| 2018/0091775 A1 | 3/2018 | Jung et al. | |
| 2018/0191930 A1 | 7/2018 | Jeong et al. | |
| 2020/0041874 A1 | 2/2020 | Nakamura | |
| 2021/0011250 A1 | 1/2021 | Tang | |

FOREIGN PATENT DOCUMENTS

| | | |
|---|---|---|
| CN | 208107758 U | 11/2018 |
| TW | M326299 U | 1/2008 |
| TW | M470037 U | 1/2014 |
| WO | 2018/181889 A1 | 10/2018 |

* cited by examiner

*Primary Examiner* — Christopher E Mahoney
(74) *Attorney, Agent, or Firm* — McClure, Qualey & Rodack, LLP (57) ABSTRACT

A camera-lens waterproofing device is provided, including a shell, a camera lens, a cover ring and an outer cover. A mounting hole is formed in a surface of the shell. The camera lens includes a body and a lens. One end of the body is disposed to the mounting hole, and the other end of the body extends out of the mounting hole. The lens is located at the other end of the body. The cover ring is connected to the body in a sleeving manner and fixed on the mounting hole. The outer cover is fixed at a periphery of the lens in a sleeving manner to form a first-layer waterproof structure and disposed on the surface of the shell, and covers the exterior of the cover ring. The cover ring abuts between the camera lens and the shell to form a second-layer waterproof structure.

11 Claims, 8 Drawing Sheets

CAMERA-LENS WATERPROOFING DEVICE

CROSS-REFERENCE TO RELATED APPLICATION

This application is a continuation application Ser. No. 16/728,211, filed on Dec. 27, 2019 with claiming foreign priority of TW108109644. The prior application is herewith incorporated by reference in its entirety.

BACKGROUND

Technical Field

The application relates to a waterproof structure, and particularly relates to a camera-lens waterproofing device.

Related Art

In order to achieve a waterproof design, a camera lens on an existing outdoor doorbell includes an optical lens piece (plastic ester or glass), a waterproof backing adhesive layer, a waterproof rubber layer, a waterproof breathable film (for preventing condensation of water vapor) or a desiccant bag (for preventing the condensation of the water vapor, which is a consumable), and the like. Therefore, after being assembled, the structure meets a requirement for waterproofing.

However, to avoid the influence on the definition of an image captured by the camera lens, the optical lens piece outside the camera lens needs to be additionally coated with a film to avoid moisture, so money should be spent on purchasing the optical lens piece and coating the film. Furthermore, in order to prevent the condensation of the water vapor, an air vent is also designed on the general optical lens piece to discharge internal hot air, and in order to avoid inflow of water droplets, the waterproof breathable film is additionally provided, so extra material cost and assembling cost are needed. Generally, if no breathable structure is designed, the desiccant bag (dryer) is additionally used inside, but this way needs regular replacement, which is time-consuming and costly.

SUMMARY

In view of this, an embodiment of the application provides a camera-lens waterproofing device, including a shell, a camera lens and an outer cover. A mounting hole is formed in a surface of the shell. The camera lens includes a body and a lens. One end of the body is disposed on the mounting hole, and the other end of the body extends out of the mounting hole. The lens is located at the other end of the body. The outer cover is arranged at a periphery of the lens in a sleeving manner and disposed on the surface of the shell. Wherein the outer cover comprises an outer layer and an inner layer, the inner layer is disposed on an inner side of the outer layer, and a thread fastened to a periphery of the camera lens is formed at one end of the inner layer.

In some embodiments, an air vent is formed in the outer cover. A breathable film is attached to an inner side of the air vent. A hollow ring slot is formed in the inner side of the outer cover.

In some embodiments, an accommodating chamber is formed on the inner side of the outer cover corresponding to the shell and the body.

In some embodiments, the inner side of the outer cover extends to form a rod piece. A through hole for allowing the rod piece to pass through is formed in the surface of the shell. An end portion of the rod piece is thermally molten to an inner side surface of the shell.

In some embodiments, a plurality of hooks is annularly arranged on the inner side of the outer cover, and a plurality of fastening slots rotatably fastened with all the hooks is formed in the surface of the shell.

In some embodiments, a groove is formed in an inner side of each hook, and an inner side of each fastening slot extend to form an elastic arm. a protruding block fastened to the groove is protruded from a side surface of the elastic arms.

In some embodiments, camera-lens waterproofing device further includes a cover ring is connected to the body in a sleeving manner and fixed to the mounting hole. The cover ring includes an inner ring surface abutting against the body, and an outer ring surface abutting against a wall surface of the mounting hole. The outer cover covers an exterior of the cover ring. And a broken opening is formed in the cover ring.

In some embodiments, the cover ring includes a ring body abutting against a surface of the camera lens, and an outer end portion forming on one end of the ring body and stuck to the surface of the shell.

In some embodiments, the cover ring includes an inner end portion forming on the other end of the ring body and stuck to an inner side surface of the shell.

In some embodiments, the camera-lens waterproofing device further includes a plurality of sealing pieces respectively attached between the shell and the outer cover, between the shell and the cover ring, or between the camera lens and the cover ring.

In some embodiments, the camera-lens waterproofing device further includes at least one sealing piece attached between the shell and the outer cover.

In some embodiments, the camera-lens waterproofing device further includes a panel attached to the surface of the shell.

According to the above, in one embodiment of the application, the outer cover covers the periphery of the camera lens to form a first-layer waterproof structure, and the cover ring abuts between the camera lens and the shell to form a second-layer waterproof structure. If the camera lens is exposed outside the shell, it is not necessary to stick a lens piece or a breathable layer, or place a desiccant bag, which reduces the material cost, the assembling cost and the consumable expenses. Furthermore, the air vent for discharging air is additionally formed in the outer cover, which enhances discharging of the water vapor and avoids ponding. Furthermore, the air vent is at a hidden position, and the inner layer (a waterproof breathable film) may also be selectively attached, which does not cause the problem of backflow of water droplets, either.

The detailed features and advantages of the application are described below in great detail through the following embodiments, the content of the detailed description is sufficient for those skilled in the art to understand the technical content of the application and to implement the application there accordingly. Based upon the content of the specification, the claims, and the drawings, those skilled in the art can easily understand the relevant objectives and advantages of the application.

DETAILED DESCRIPTION OF THE EMBODIMENTS

Figure 1:
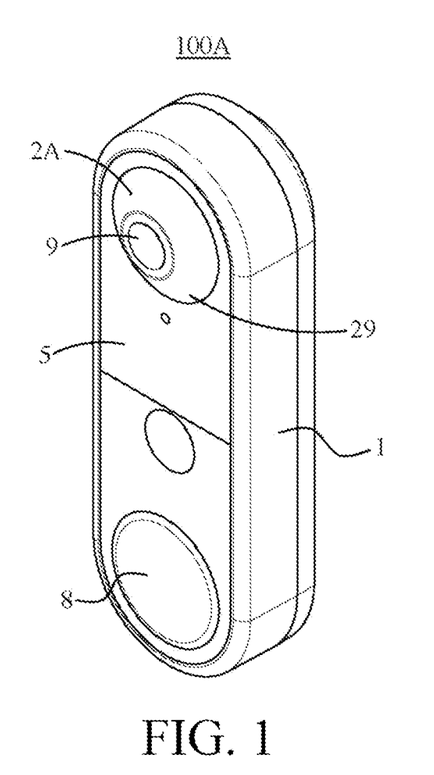
FIG. 1 is a schematic appearance diagram of a camera-lens waterproofing device according to a first embodiment of the application.
Figure 2:
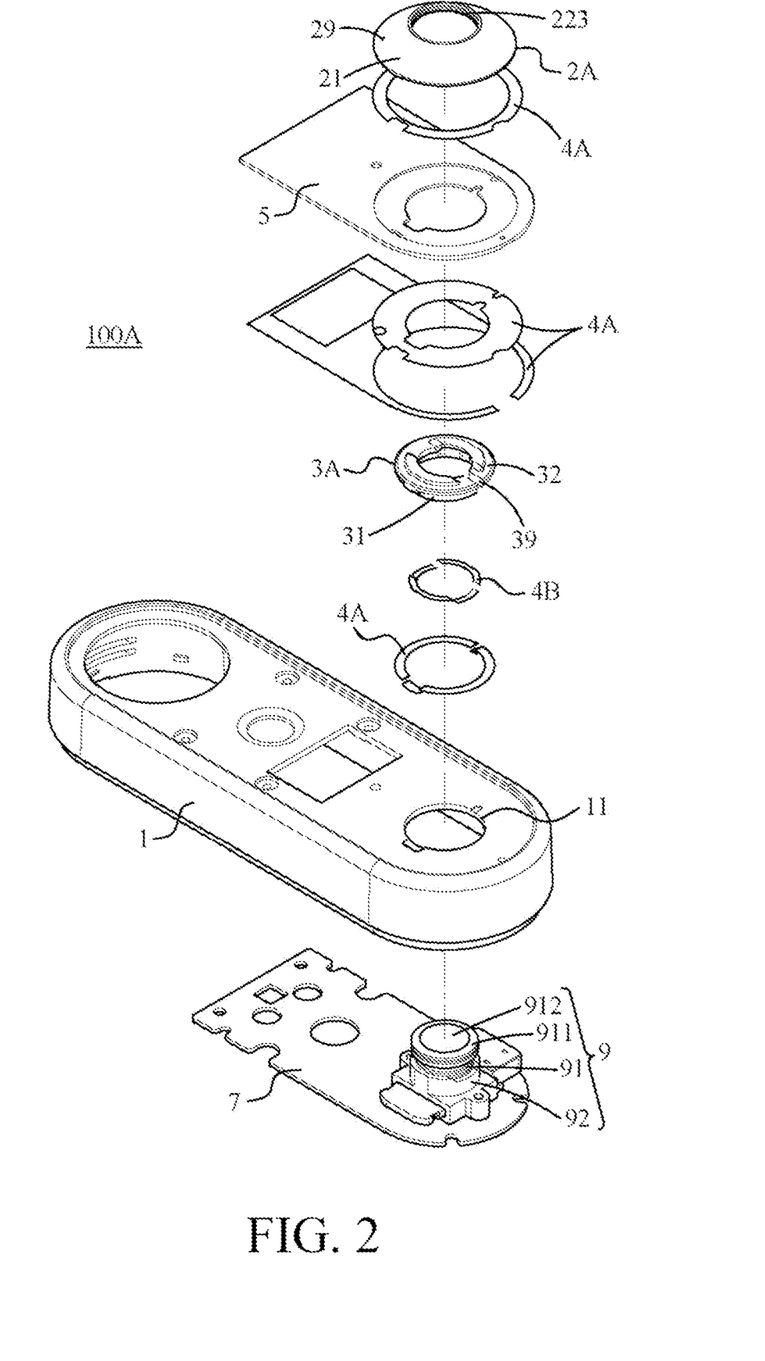
FIG. 2 is a schematic exploded diagram of the camera-lens waterproofing device according to the first embodiment of the application.
Figure 3:
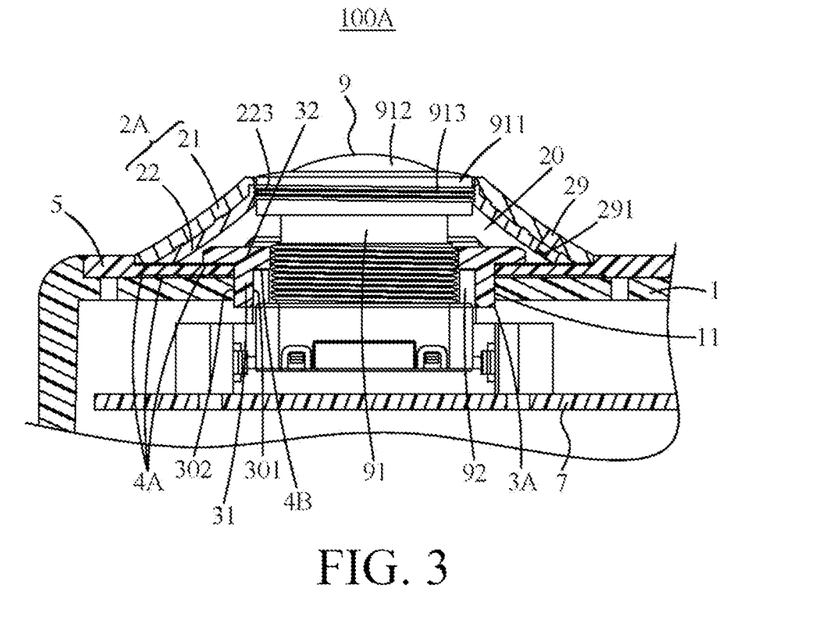
FIG. 3 is a schematic cross-sectional diagram of the camera-lens waterproofing device according to the first embodiment of the application.

Referring to FIG. 1 to FIG. 3, FIG. 1 is a schematic appearance diagram, FIG. 2 is a schematic exploded diagram, and FIG. 3 is a schematic cross-sectional diagram. According to a first embodiment of the application, a camera-lens waterproofing device 100A is used on an outdoor doorbell, but is not limited thereto. In some implementation examples, the camera-lens waterproofing device 100A may be also used on an outdoor monitor, or on small-sized portable photographic equipment. Here, the camera-lens waterproofing device 100A includes a shell 1, a camera lens 9, an outer cover 2A and a cover ring 3A.

Referring to FIG. 1 to FIG. 3, in the present embodiment, a mounting hole 11 is formed in a surface of the shell 1.

Referring to FIG. 1 to FIG. 3, in the present embodiment, the camera lens 9 includes a body 91 and a lens 912. One end of the body 91 is disposed in the mounting hole 11, and the other end of the body 91 extends out of the mounting hole 11. The lens 912 is located at the other end of the body 91.

Referring to FIG. 1 to FIG. 3, in the present embodiment, the cover ring 3A is connected to the body 91 in a sleeving manner and fixed on the mounting hole 11. The cover ring 3A includes an inner ring surface 301 abutting against the surface of the body 91, and an outer ring surface 302 abutting against the wall surface of the mounting hole 11.

Referring to FIG. 1 to FIG. 3, in the present embodiment, the outer cover 2A is arranged at a periphery of the lens 912 in a sleeving manner and disposed on the surface of the shell 1, and covers the exterior of the cover ring 3A.

Referring to FIG. 1 to FIG. 3, in the present embodiment, the outer cover 2A covers the shell 1 and is fixed at a periphery of the camera lens 9 to play a role of preventing water vapor from permeating from a gap between the outer cover 2A and the camera lens 9 and preventing water vapor from permeating from a gap between the outer cover 2A and the shell 1, and the outer cover 2A is used as a guard of a first-layer waterproof structure on the outermost layer around the camera lens 9. The cover ring 3A is fixed between the camera lens 9 and the mounting hole 11 to play a role of preventing water vapor from permeating from a gap between the camera lens 9 and the mounting hole 11, and the cover ring 3A is used as a guard of a second-layer waterproof structure on the innermost layer around the camera lens 9. If the camera lens 9 provided is directly exposed outside the shell 1, it is not necessary to stick a lens piece or a breathable layer outside or place a desiccant bag, which reduces the material cost, the assembling cost and the expenses on consumables and the like.

Referring to FIG. 1 to FIG. 3, more specifically, in the present embodiment, the shell 1 is a rectangular housing. The mounting hole 11 is formed in one side of the surface of the shell 1, and a button 8 is arranged on the other side of the surface of the shell 1. The camera lens 9 is arranged on the mounting hole 11. A circuit board 7 is arranged in the shell 1, and is locked to the inner side of the shell 1. The button 8 and the camera lens 9 are electrically connected to the circuit board 7.

Referring to FIG. 1 to FIG. 3, more specifically, in the present embodiment, the camera lens 9 includes the body 91 and a base 92. The base 92 is welded on the circuit board 7. The body 91 is screwed to the base 92, and has an outer ring portion 911 and the lens 912 located at the top of the outer ring portion 911. A thread 913 may be formed at an outer edge of the outer ring portion 911. The body 91 extends out of the mounting hole 11 such that the lens 912 is exposed outside the mounting hole 11. Herein, all the parts of the camera lens 9 may be integrally pre-packaged and welded on the circuit board 7, and the structure of the camera lens 9 has an effect of preventing the permeation of water vapor.

Referring to FIG. 1 to FIG. 3, more specifically, in the present embodiment, the outer cover 2A is a horn-shaped ring body and is arranged on the surface of the shell 1. The outer cover 2A covers the periphery of the camera lens 9 to form the first-layer waterproof structure. Furthermore, the outer cover 2A covers around the camera lens 9 such that the lens 912 of the camera lens 9 is exposed from a round hole in the center of the outer cover 2A.

Figure 4:
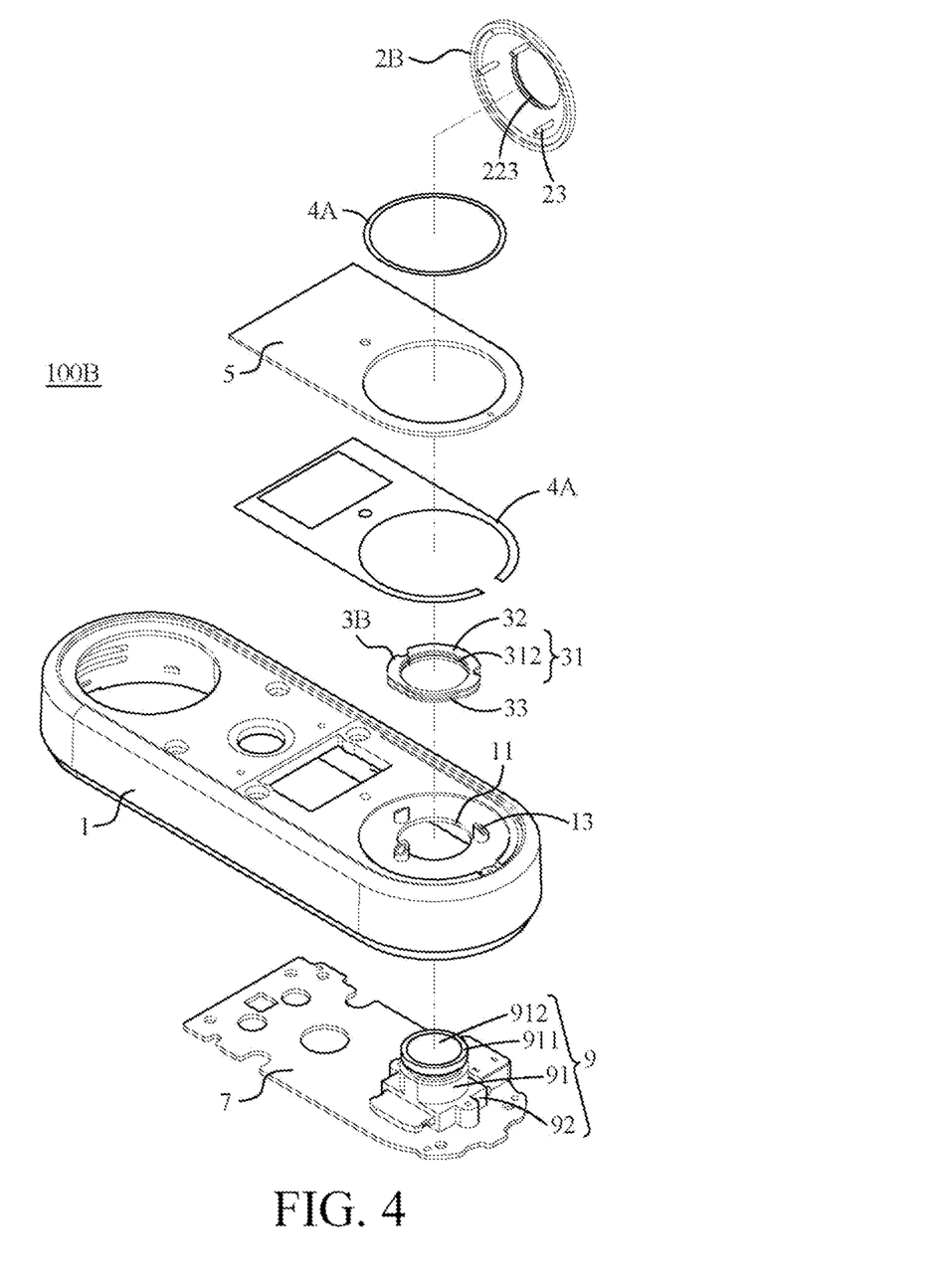
FIG. 4 is a schematic exploded diagram of a camera-lens waterproofing device according to a second embodiment of the application.
Figure 5:
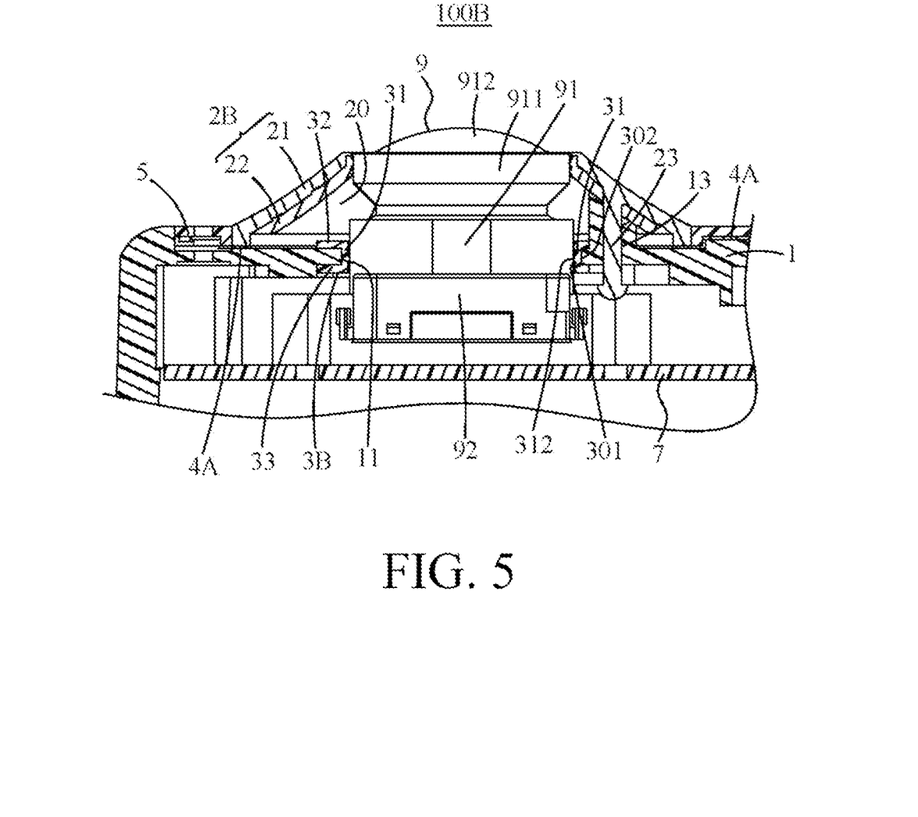
FIG. 5 is a schematic cross-sectional diagram of the camera-lens waterproofing device according to the second embodiment of the application.

Referring to FIG. 1 to FIG. 3, more specifically, in the present embodiment, the outer cover 2A includes an outer layer 21 and an inner layer 22 disposed on the inner side of the outer layer 21. A thread 223 screwed to the periphery of the camera lens 9 is formed at one end of the inner layer 22. Herein, the thread 223 of the inner layer 22 is the thread 913 screwed to the outer ring portion 911 of the camera lens 9, but is not limited thereto. In some implementation examples, if the outer ring portion 911 of the camera lens 9 is not provided with the thread 913, the thread 223 of the inner layer 22 may also be closely stuck to the outer ring portion 911 (as shown in FIG. 4 and FIG. 5). In addition, the outer layer 21 is a hard glue layer made of polycarbonate (PC) and acrylonitrile butadiene styrene (ABS), and the inner layer 22 is a flexible glue layer made of thermoplastic polyurethane (TPU).

Referring to FIG. 1 to FIG. 3, more specifically, in the present embodiment, an air vent 29 is formed in the surface of the outer cover 2A. A hollow ring slot is formed in the inner side of the outer cover 2A. An accommodating chamber 20 is formed on the inner side of the outer cover 2A among the shell 1, the body 91, the cover ring 3A and the outer cover 2A, and is used as a guide space for air. When hot air generated by an electronic element (such as an element on the circuit board 7) in the shell 1 is emitted to the accommodating chamber 20, the hot air may be discharged from the air vent 29, thereby preventing water droplets formed by the hot air from being accumulated in the accommodating chamber 20. In addition, a waterproof breathable film 291 may be further attached to the inner side of the air vent 29 to prevent rainwater from permeating into the accommodating chamber 20 through the air vent 29. Furthermore, the air vent 29 is at a hidden position, and an inner layer (the breathable film 291) may be selectively additionally attached, which may not cause the problem of backflow of the water droplets, either.

Referring to FIG. 1 to FIG. 3, more specifically, in the present embodiment, the cover ring 3A is a round plastic ring. The cover ring 3A is fixed to the mounting hole 11. The cover ring 3A is connected to the camera lens 9 in a sleeving manner to form a second-layer waterproof structure. The inner ring surface 301 of the cover ring 3A abuts against the surface of the camera lens 9, and the outer ring surface 302 of the cover ring 3A abuts against the wall surface of the mounting hole 11.

Referring to FIG. 1 to FIG. 3, more specifically, in the present embodiment, the structure of the cover ring 3A is matched with the appearance design of the structure of the camera lens 9. The cover ring 3A includes a ring body 31 abutting against the surface of the camera lens 9, and an outer end portion 32 forming on one end of the ring body 31 and stuck to the surface of the shell 1. It can be seen that the cross sections of the ring body 31 and the outer end portion 32 are both of a T shape. Herein, the inner side surface of the ring body 31 of the cover ring 3A is closely stuck to the base 92 of the camera lens 9, and the inner side surface of the outer end portion 32 of the cover ring 3A is closely stuck to the body 91 of the camera lens 9.

Referring to FIG. 1 to FIG. 3, more specifically, in the present embodiment, a broken opening 39 is formed in the cover ring 3A. The inner diameter of the cover ring 3A is less than the outer diameter of the camera lens 9. During mounting, the broken opening 39 of the cover ring 3A is expanded to increase the inner diameter of the cover ring 3A until the cover ring 3A may be mounted outside the camera lens 9. In addition, when stuffed into the mounting hole 11, the cover ring 3A is pressed by the wall surface at the hole edge of the mounting hole 11, and the broken opening 39 of the cover ring 3A is closed, and the cover ring 3A closes the gap between the camera lens 9 and the mounting hole 11 to prevent water vapor from permeating from the gap between the camera lens 9 and the mounting hole 11.

Referring to FIG. 1 to FIG. 3, more specifically, in the present embodiment, the camera-lens waterproofing device 100A further includes a panel 5. The panel 5 is attached to the surface of the shell 1. One end of the outer cover 2A is attached to the panel 5, and the other end of the outer cover 2A covers the periphery of the camera lens 9. Furthermore, the cover ring 3A is connected to a perforated position of the panel 5 in a sleeving manner.

Referring to FIG. 1 to FIG. 3, more specifically, in the present embodiment, the camera-lens waterproofing device 100A further includes a plurality of sealing pieces 4A. All the sealing pieces 4A are respectively attached between the panel 5 and the outer cover 2A, between the panel 5 and the shell 1, and/or between the panel 5 and the cover ring 3A, and are not limited thereto. In some embodiments, when the design of the panel 5 is omitted, all the sealing pieces 4A are respectively attached between the shell 1 and the outer cover 2A, between the shell 1 and the cover ring 3A, and/or between the camera lens 9 and the cover ring 3A.

Referring to FIG. 1 to FIG. 3, more specifically, in the present embodiment, each of the sealing pieces 4A is a double-faced adhesive, but is not limited thereto. In some implementation examples, the sealing pieces 4A may also be glue. Particularly, glue type sealing pieces 4B are dispensed between the camera lens 9 and the cover ring 3A (as shown in FIG. 3), so as to permeate into the gap between the camera lens 9 and the cover ring 3A.

Referring to FIG. 4 to FIG. 5, FIG. 4 is a schematic exploded diagram, and FIG. 5 is a schematic cross-sectional diagram. According to a second embodiment of the application, a difference between a camera-lens waterproofing device 100B of the second embodiment and the camera-lens waterproofing device 100A of the first embodiment lies in that: an outer cover 2B and the shell 1 of the present embodiment are combined in a hot melting manner. The inner side of the outer cover 2B extends to the outside to form a rod piece 23. A through hole 13 for allowing the rod piece 23 to run through is formed in the surface of the shell 1. An end portion of the rod piece 23 is thermally molten after passing through the through hole 13, so that a protruding block is formed at the end portion of the rod piece 23. The protruding block is fixed to the inner side surface of the shell 1 to enable the outer cover 2B to be stably located on the shell 1.

Referring to FIG. 4 and FIG. 5, a difference between the camera-lens waterproofing device 100B of the second embodiment and the camera-lens waterproofing device 100A of the first embodiment lies in that: the structure of a cover ring 3B of the present embodiment is matched with the appearance design of the structure of the camera lens 9. The cover ring 3B includes a ring body 31 abutting against the surface of the camera lens 9, an outer end portion 32 forming on one end of the ring body 31 and stuck to the surface of the shell 1, and an inner end portion 33 forming on the other end of the ring body 31 and stuck to the inner side surface of the shell 1. It can be seen that the cross sections of the ring body 31, the outer end portion 32 and the inner end portion 33 are all of a C shape. Herein, a plurality of protruding ribs 312 is formed on the inner side surface of the ring body 31 of the cover ring 3B. All the protruding ribs 312 closely abut against the body 91 of the camera lens 9, so that the cover ring 3B closes the gap between the camera lens 9 and the mounting hole 11.

Figure 6:
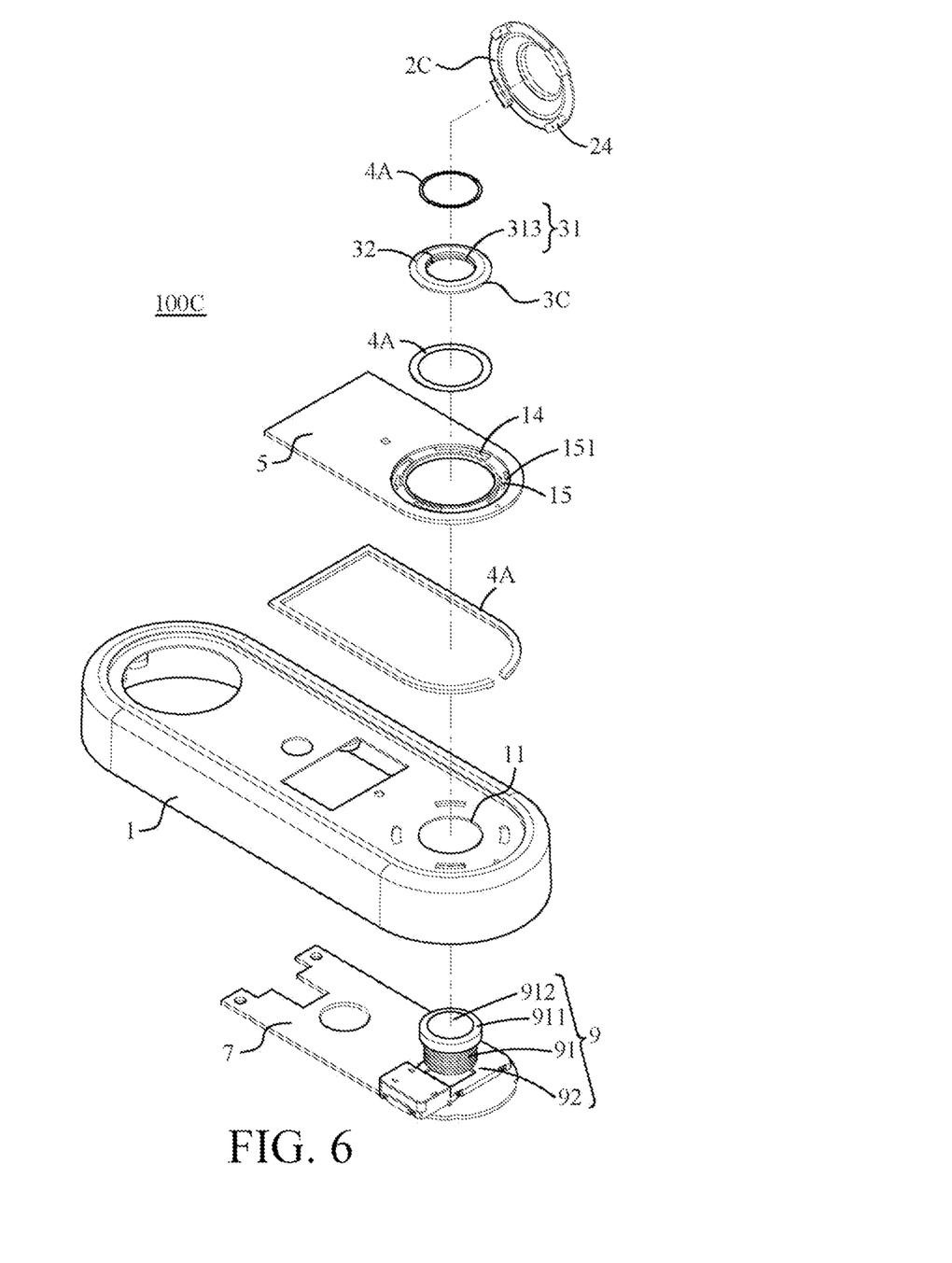
FIG. 6 is a schematic exploded diagram of a camera-lens waterproofing device according to a third embodiment of the application.
Figure 7:
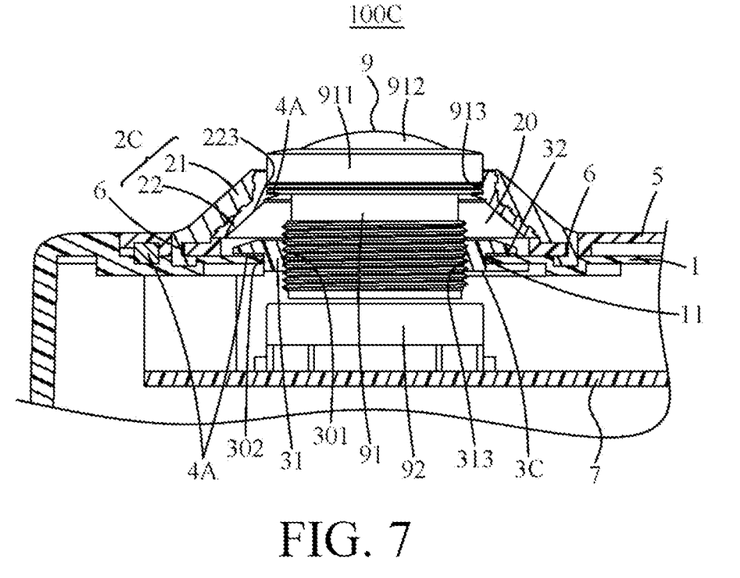
FIG. 7 is a schematic cross-sectional diagram of the camera-lens waterproofing device according to the third embodiment of the application.
Figure 8:
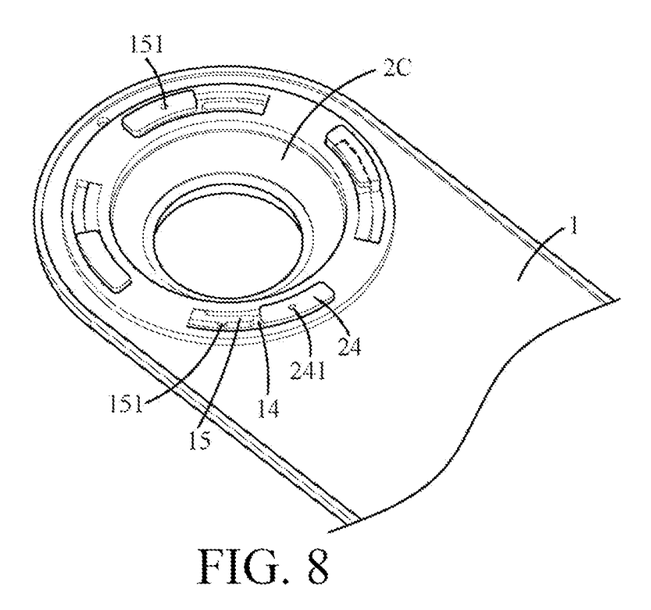
FIG. 8 is a schematic appearance diagram before rotatable fastening according to the third embodiment of the application.
Figure 9:
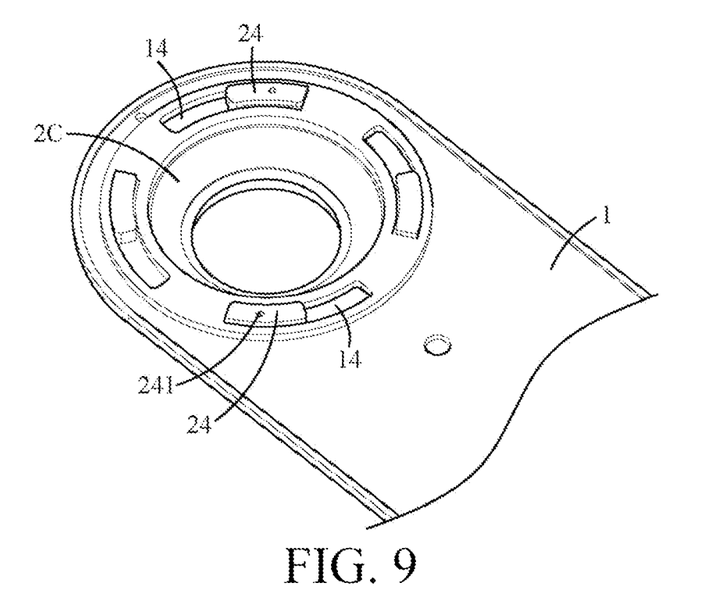
FIG. 9 is a schematic appearance diagram after rotatable fastening according to the third embodiment of the application.

Referring to FIG. 6 to FIG. 9, FIG. 6 is a schematic exploded diagram, FIG. 7 is a schematic cross-sectional diagram, FIG. 8 is a schematic appearance diagram before rotatable fastening, and FIG. 9 is a schematic appearance diagram after rotatable fastening. FIG. 8 and FIG. 9 are back surfaces of an outer cover 2C and the shell 1. According to a third embodiment of the application, a difference between a camera-lens waterproofing device 100C of the third embodiment and the camera-lens waterproofing device 100A of the first embodiment lies in that: the outer cover 2C and the shell 1 of the present embodiment are rotatably fastened. A plurality of hooks 24 is annularly arranged on the inner side of the outer cover 2C, and a plurality of fastening slots rotatably fastened with respective hooks 24 is formed in the surface of the shell 1.

Referring to FIG. 6 to FIG. 9, a difference between the camera-lens waterproofing device 100C of the third embodiment and the camera-lens waterproofing device 100A of the first embodiment lies in that: grooves 241 are formed in the inner sides of the hooks 24 of the present embodiment, and fastening slots 14 are formed on the panel 5 as shown in FIG. 6. Furthermore, the inner sides of the fastening slots 14 extend to form elastic arms 15, and protruding blocks 151 fastened to the grooves 241 protrude from the side surfaces of the elastic arms 15, but the application is not limited thereto. In some implementation examples, when the structure of the panel 5 is omitted, the inner sides of the fastening slots 14 on the shell 1 may extend to form the elastic arms 15, and protruding blocks 151 (as shown in FIG. 8 and FIG.

9) fastened to the grooves 241 protrude from the side surfaces of the elastic arms 15. When the outer cover 2C is assembled on the shell 1, the hooks 24 of the outer cover 2C are aligned with and mounted into the fastening slots 14, and then the outer cover 2C is rotated such that the hooks 24 are fastened with the elastic arms 15 and the protruding blocks 151 on the elastic arms 15 are clamped into the grooves 241 in the hooks 24, thereby enabling the outer cover 2C to be stably located on the shell 1.

Referring to FIG. 6 to FIG. 9, in the present embodiment, high-density elastic bodies 6 (poron, a microcellular polymer material) are arranged between the outer cover 2C and the shell 1, and have a uniform microcellular structure. The elastic bodies 6 may be arranged in the fastening slots 14 of the panel 5 or the fastening slots 14 of the shell 1, or the elastic bodies 6 may be arranged in the hooks 24. When the outer cover 2C and the shell 1 are rotatably fastened, the hooks 24 move to the inner sides of fastening slots 14 and press the elastic bodies 6, and the cellular structures of the pressed elastic bodies 6 are difficult to damage. The elastic bodies 6 may be closely stuck between the hooks 24 and the fastening slots 14, so that the elastic bodies 6 close gaps between the hooks 24 and the fastening slots 14.

Referring to FIG. 6 to FIG. 9, in the present embodiment, the structure of a cover ring 3C is matched with the appearance design of the structure of the camera lens 9. The cover ring 3C includes a ring body 31 abutting against the surface of the camera lens 9, and an outer end portion 32 forming on one end of the ring body 31 and abutting against the surface of the shell 1. It can be seen that the cross sections of the ring body 31 and the outer end portion 32 are both of an L shape. Herein, an internal thread 313 screwed to the body 91 of the camera lens 9 is formed on the inner side surface of the ring body 31 of the cover ring 3C, and a thread correspondingly screwed to the internal thread 313 is formed on the body 91, so that the cover ring 3C closes the gap between the camera lens 9 and the mounting hole 11.

The outer cover 2A and the shell 1 of the first embodiment are attached in a gluing manner. The outer cover 2B and the shell of the second embodiment are combined in the hot melting manner, and the shell 1 and the outer cover 2B of the second embodiment may also be combined through the gluing manner of the first embodiment. The outer cover 2C and the shell 1 of the third embodiment are rotatably fastened, and the camera lens 9 and the outer cover 2C, or the shell 1 and the cover ring 3C of the third embodiment may also be combined through the gluing manner of the first embodiment at the same time.

Particularly, as shown in FIG. 7, sealing pieces 4A are attached to the inner side of the thread 223 of the inner layer 22 of the outer cover 2C of the third embodiment. After the thread 223 of the inner layer 22 is screwed to the thread 913 on the outer ring portion 911 of the camera lens 9, the sealing pieces 4A are closely attached to the thread 223 and the thread 913, so that the sealing pieces 4A close a gap between the thread 223 and the thread 913.

According to the above, in the camera-lens waterproofing device of one embodiment of the application, the outer cover covers the periphery of the camera lens to form the first-layer waterproof structure, and the cover ring abuts between the camera lens and the shell to form the second-layer waterproof structure. If the camera lens is directly exposed outside the shell, it is not necessary to stick a lens piece or a breathable layer outside, or place a desiccant bag, which reduces the material cost, the assembling cost and the consumable expenses. Furthermore, the air vent for discharging air is additionally set on the outer cover, which enhances discharging of the water vapor and avoids ponding. Furthermore, the air vent is at a hidden position, and the inner layer (the waterproof breathable film) may also be selectively attached, which does not cause the problem of backflow of water droplets, either. In addition, the camera-lens waterproofing device may reach the IPX6 waterproofing grade.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A camera-lens waterproofing device, comprising:
a shell, a mounting hole being formed in a surface of the shell;
a camera lens, comprising a body and a lens, one end of the body being disposed in the mounting hole, and the other end of the body extending out of the mounting hole, and the lens being located at the other end of the body; and
an outer cover, arranged at a periphery of the lens in a sleeving manner, disposed on the surface of the shell, wherein the outer cover comprises an outer layer and an inner layer, the inner layer is disposed on an inner side of the outer layer, and a thread fastened to a periphery of the camera lens is formed at one end of the inner layer;
wherein an accommodating chamber is formed on the inner side of the outer cover corresponding to the shell and the body.

2. The camera-lens waterproofing device according to claim 1, wherein an air vent is formed in the outer cover; a breathable film is attached to an inner side of the air vent; and a hollow ring slot is formed in the inner side of the outer cover.

3. The camera-lens waterproofing device according to claim 1, wherein the inner side of the outer cover extends to form a rod piece; a through hole for allowing the rod piece to pass through is formed in the surface of the shell; and an end portion of the rod piece is thermally molten to an inner side surface of the shell.

4. The camera-lens waterproofing device according to claim 1, wherein a plurality of hooks is annularly arranged on the inner side of the outer cover, and a plurality of fastening slots rotatably fastened with the plurality of hooks is formed in the surface of the shell.

5. The camera-lens waterproofing device according to claim 4, wherein a groove is formed in an inner side of each hook; an inner side of each fastening slot extends to form an elastic arm; and a protruding block fastened to the groove is protruded from a side surface of the elastic arm.

6. The camera-lens waterproofing device according to claim 1, further comprising a cover ring, connected to the body in a sleeving manner and fixed on the mounting hole, the cover ring comprising an inner ring surface and an outer ring surface, the inner ring surface abutting against the body, the outer ring surface abutting against a wall surface of the mounting hole, and the outer cover covering an exterior of the cover ring and a broken opening is formed in the covering.

7. The camera-lens waterproofing device according to claim 6, wherein the cover ring comprises a ring body abutting against a surface of the camera lens, and an outer end portion forming on one end of the ring body and stuck to the surface of the shell.

8. The camera-lens waterproofing device according to claim 7, wherein the cover ring comprises an inner end portion forming on the other end of the ring body and stuck to an inner side surface of the shell.

9. The camera-lens waterproofing device according to claim 6, further comprising a plurality of sealing pieces, respectively attached between the shell and the outer cover, between the shell and the cover ring, or between the camera lens and the cover ring.

10. The camera-lens waterproofing device according to claim 1, further comprising at least one sealing piece, attached between the shell and the outer cover.

11. The camera-lens waterproofing device according to claim 1, further comprising a panel, attached to the surface of the shell.

* * * * *